United States Patent
van Roermund et al.

(10) Patent No.: US 9,953,145 B2
(45) Date of Patent: Apr. 24, 2018

(54) CONFIGURATION METHOD, CONFIGURATION DEVICE, COMPUTER PROGRAM PRODUCT AND CONTROL SYSTEM

(71) Applicant: NXP B.V., Eindhoven (NL)

(72) Inventors: Timo van Roermund, Eindhoven (NL); Ewout Brandsma, Eindhoven (NL); Maarten Christiaan Pennings, Waalre (NL); Aly Aamer Syed, Deurne (NL)

(73) Assignee: NXP B.V., Eindhoven (NL)

( * ) Notice: Subject to any disclaimer, the term of this patent is extended or adjusted under 35 U.S.C. 154(b) by 28 days.

(21) Appl. No.: 13/754,729

(22) Filed: Jan. 30, 2013

(65) Prior Publication Data
US 2013/0198813 A1 Aug. 1, 2013

(30) Foreign Application Priority Data
Jan. 31, 2012 (EP) .................................... 12153224

(51) Int. Cl.
*G06F 7/04* (2006.01)
*G06F 21/30* (2013.01)
(Continued)

(52) U.S. Cl.
CPC .............. *G06F 21/30* (2013.01); *G06F 21/35* (2013.01); *H04L 12/2807* (2013.01); *G05B 2219/24164* (2013.01); *G05B 2219/2642* (2013.01)

(58) Field of Classification Search
CPC ........... G06F 21/30; G06F 21/35; G06F 21/76
(Continued)

(56) References Cited

U.S. PATENT DOCUMENTS 6,646,550 B1 * 11/2003 Runyon et al. ................ 340/541
6,667,690 B2 * 12/2003 Durej et al. ................ 340/572.1
(Continued)

FOREIGN PATENT DOCUMENTS

CN 102012989 A 4/2011
EP 1335563 A2 8/2003
(Continued)

OTHER PUBLICATIONS

"Wi-Fi Simple Configuration Technical Specification—Version 2.0. 0" Wi Fi Alliance, 154 pgs, retrieved from the internet at: https://www.wi-fi.org/knowledge-center/published-specifications (Dec. 2010).
(Continued)

*Primary Examiner* — Mohammad W Reza

(57) ABSTRACT

According to an aspect of the invention a configuration method for configuring a host device in a control system is conceived, in particular a building control system, wherein an authorized configuration device exchanges confidential configuration data with a radio frequency identification tag coupled to the host device, wherein, after the confidential configuration data have been exchanged and a corresponding configuration operation has been performed, access to the confidential configuration data by an unauthorized configuration device is precluded. According to further aspects of the invention a corresponding configuration device, a corresponding computer program product and a corresponding control system are conceived.

15 Claims, 4 Drawing Sheets

(51) Int. Cl.
*G06F 21/35* (2013.01)
*H04L 12/28* (2006.01)

(58) Field of Classification Search
USPC .......................................................... 726/4
See application file for complete search history.

(56) References Cited

U.S. PATENT DOCUMENTS

| | | | |
|---|---|---|---|
| 6,995,652 B2 | 2/2006 | Carrender et al. | |
| 7,023,341 B2 | 4/2006 | Stilp | |
| 7,250,695 B2 | 7/2007 | Connors et al. | |
| 7,739,468 B2* | 6/2010 | Chang | 711/163 |
| 7,817,042 B2 | 10/2010 | Winget et al. | |
| 7,872,582 B1 | 1/2011 | Diorio | |
| 7,912,224 B2 | 3/2011 | Lee et al. | |
| 7,957,528 B2 | 6/2011 | Iwamura | |
| 8,072,332 B2 | 12/2011 | Forster | |
| 8,232,862 B2 | 7/2012 | Lowe | |
| 2004/0098581 A1 | 5/2004 | Balfanz et al. | |
| 2005/0246770 A1 | 11/2005 | Hunt et al. | |
| 2006/0032901 A1 | 2/2006 | Sugiyama et al. | |
| 2006/0132301 A1 | 6/2006 | Stilp | |
| 2006/0150240 A1 | 7/2006 | Robinson et al. | |
| 2006/0258289 A1 | 11/2006 | Dua | |
| 2007/0054616 A1* | 3/2007 | Culbert | H04L 63/0492 455/41.1 |
| 2007/0202807 A1 | 8/2007 | Kim | |
| 2008/0001724 A1 | 1/2008 | Soleimani et al. | |
| 2008/0001725 A1 | 1/2008 | White et al. | |
| 2008/0090520 A1 | 4/2008 | Camp et al. | |
| 2008/0143487 A1 | 6/2008 | Hulvey | |
| 2008/0204248 A1* | 8/2008 | Cam Winget | H04W 8/245 340/572.4 |
| 2008/0267195 A1 | 10/2008 | Belmon | |
| 2009/0063851 A1 | 3/2009 | Nijdam | |
| 2009/0298555 A1 | 12/2009 | Matson et al. | |
| 2009/0313481 A1 | 12/2009 | Kock et al. | |
| 2010/0161982 A1 | 6/2010 | Oh et al. | |
| 2010/0230498 A1 | 9/2010 | Atherton | |
| 2010/0231407 A1 | 9/2010 | Carr | |
| 2010/0318693 A1 | 12/2010 | Espig et al. | |
| 2011/0037568 A1 | 2/2011 | Kim et al. | |
| 2011/0116631 A1 | 5/2011 | Shon et al. | |
| 2011/0156879 A1 | 6/2011 | Matsushita et al. | |
| 2011/0169606 A1 | 7/2011 | Brandsma | |
| 2011/0210831 A1 | 9/2011 | Talty et al. | |
| 2011/0283104 A1 | 11/2011 | Sangubhatla | |
| 2011/0291803 A1 | 12/2011 | Bajic et al. | |
| 2012/0098428 A1 | 4/2012 | Koppelaar et al. | |
| 2012/0204032 A1 | 8/2012 | Wilkins et al. | |
| 2012/0317247 A1* | 12/2012 | Dattagupta et al. | 709/220 |
| 2013/0002398 A1 | 1/2013 | Brown et al. | |
| 2013/0076491 A1 | 3/2013 | Brandsma | |
| 2013/0141223 A1 | 6/2013 | Brandsma et al. | |
| 2013/0198813 A1 | 8/2013 | Roermund et al. | |
| 2013/0211761 A1 | 8/2013 | Brandsma et al. | |
| 2013/0271268 A1 | 10/2013 | Brandsma et al. | |
| 2013/0312072 A1 | 11/2013 | Roermund et al. | |
| 2014/0068089 A1 | 3/2014 | Brandsma et al. | |

FOREIGN PATENT DOCUMENTS

| | | |
|---|---|---|
| EP | 1395019 | 3/2004 |
| EP | 1993301 B1 | 11/2008 |
| EP | 2 056 229 A2 | 5/2009 |
| JP | 2007-114873 A | 5/2007 |
| WO | 00/34605 | 6/2000 |
| WO | 02/44876 A2 | 6/2002 |
| WO | 02/084584 A1 | 10/2002 |
| WO | 2005/024745 A2 | 3/2005 |
| WO | 2005/120086 A1 | 12/2005 |
| WO | 2006/031531 A1 | 3/2006 |
| WO | 2006/054070 | 5/2006 |
| WO | 2006/116168 | 11/2006 |
| WO | 2007/046443 A1 | 4/2007 |
| WO | 2007/076191 | 7/2007 |
| WO | 2007/101080 | 9/2007 |
| WO | 2008/002392 A2 | 1/2008 |
| WO | 2008/002965 A2 | 1/2008 |
| WO | 2008/074050 A1 | 6/2008 |
| WO | 2008/103567 A1 | 8/2008 |
| WO | 2009/044228 | 4/2009 |
| WO | 2009/048467 | 4/2009 |
| WO | 2008/059460 | 5/2009 |
| WO | 2009/104131 | 8/2009 |
| WO | 2009/128032 | 10/2009 |
| WO | 2009/131381 | 10/2009 |
| WO | 2009/131381 A2 | 10/2009 |
| WO | 2010/032227 A1 | 3/2010 |
| WO | 2010/032337 | 3/2010 |
| WO | 2010/049383 A1 | 5/2010 |
| WO | 2010/116327 A1 | 10/2010 |
| WO | 2011/017007 | 2/2011 |
| WO | 2011/035411 | 3/2011 |
| WO | 2011/035412 | 3/2011 |
| WO | 2011/035413 | 3/2011 |
| WO | 2011/035414 | 3/2011 |
| WO | 2011/097116 | 8/2011 |

OTHER PUBLICATIONS

Extended European Search Report for Patent Appln. No. EP 12153224.6 (Jul. 4, 2012).
"Communication Pursuant to Article 94(3) for EP11182503.0 dated Dec. 3, 2013".
"Extended European Search Report for EP12168079.7 dated Oct. 10, 2012".
"Extended Search Report for EP 11182503.0 dated Feb. 22, 2012".
"LPC1110/11/12/13/14/15 Product Data Sheet, Rev. 7.4", NXP, 110 pgs, retrieved from the internet at: http://www.nxp.com/documents/data_sheet/LPC111X.pdf.
"NFC Forum, Connection Handover, Technical Specification", Version 1.2, 27 Pages (Jul. 2010).
"Nokia 6212 Classic NFC Pairing with BH-505", NokiaManiacz, video from the Internet Sep. 19, 2012 http://www.youtube.com/watch?v=pG60sBBArM4.
"Nokia, "Nokia Bluetooth Stereo Headset BH-505"", retrieved from the internet http://nds1.nokia.com/files/support/apac/phones/guides/Nokia_BH-505_APAC_UG_en.pdf, 14 pgs.
"PGP, PGP Global Directory Frequently Asked Questions (FAQ)", PGP Corp. [online] copyright 1991-2008, [Retrieved on Oct. 30, 2014], Retrieved from the Internet <http://keyserver.pgp.com/VKDHelpPGPCom.htm>.
Klein, "Designing Bulk Encoding Applications Using UHF RFID Technology", Datasheet [online], digi-Key Corp. copyright 2011, [retrieved on Oct. 30, 201], Retrieved from the Internet: <http://www.digikey.com/Web%20Export/Supplier%20Content/thing-magic-1523/pdf/thingmagic designing-bulk-encoding-applications.pdf?redirected=1>.
M'raihi, et al., "HOTP:An HMAC-Based One-Time Password Algorithim,", IETF [online] Dec. 2005, [Retrieved on Oct. 30, 2014], Retrieved from the internet:<http://tools.ietf.org/html/rfc4226>.
M'raihi, et al., "TOP: Time-Based One-Time Password Algorithim, IETF [online], May 2011, [Retrieved on Oct. 30, 2014], Retrieved from the Internet::<http://tools.ietf.org/html/rfc6238>".
Chinese Office Action for Chinese Application No. 201310032056.0, Aug. 7, 2015.
Non-Final Office Action dated Feb. 12, 2016 in related U.S. Appl. No. 13/866,822.
RIPE NCC RPKI (Resource Public Key Infrastructure) Certification Practice Statement (CPS), Ripe Network Corporation, published Dec. 14, 2011, 39 pages.
"Wi-Fi Simple Configuration Technical Specification Version 2.0.0" Wi-Fi Alliance, 154 pgs. (2010).

* cited by examiner

CONFIGURATION METHOD, CONFIGURATION DEVICE, COMPUTER PROGRAM PRODUCT AND CONTROL SYSTEM

CROSS-REFERENCE TO RELATED APPLICATIONS

This application claims the priority under 35 U.S.C. § 119 of European patent application no. 12153224.6, filed on Jan. 31, 2012, the contents of which are incorporated by reference herein.

FIELD OF THE INVENTION

The invention relates to a configuration method for configuring host devices in a control system. Furthermore, the invention relates to a corresponding configuration device, to a corresponding computer program product and a corresponding control system.

BACKGROUND OF THE INVENTION

Modern building control systems comprise a large number of devices, for example sensors, lights, valves, HVAC equipment and security equipment. In the context of the present invention these devices are referred to as host devices. The most advanced buildings are approaching one host device installed per square meter. The commissioning of building control systems is increasingly labor intensive and prone to errors. For example, it has been shown that the technical installations in 70% of the utility buildings in the Netherlands do not function according to specification, causing an increase in energy consumption of 25%.

Commissioning of building control systems involves the configuration of the host devices. The configuration of host devices comprises amongst others the exchange of configuration data between a configuration device and the host device in order to configure said host device. For example, the configuration device may be an installation device which transmits configuration data to a host device via an RFID connection. These configuration data may comprise network parameters which enable the host device to join a network, for example a Wi-Fi network, via a further communication link. Furthermore, the configuration data may comprise configuration parameters necessary for pairing devices or establishing a control relationship between devices, for example. Operations such as joining a network, pairing devices and establishing a control relationship between devices are referred to as configuration operations.

It is noted that, in the context of the present invention, a complete system comprising for example sensors, actuators, and controllers used to control HVAC, lighting, security, and safety in a building is called a building control system (BCS). A component (e.g. a computer) or a subsystem of the BCS that is used to commission the BCS initially and possibly to (partially) re-commission it later is referred to as a building commissioning system.

Typically, the exchange of said configuration data is facilitated by a radio frequency identification (RFID) tag coupled to the host device. This RFID tag may be a connected tag which has a wired data connection with a microcontroller (host controller) of the host device or an unconnected tag which does not have such a wired data connection. In case of a connected tag, network parameters are typically written to the tag by an installation device via an RFID connection. Subsequently, the network parameters are read by the host controller via the wired data connection. The network parameters can then be used by the host controller to join the network via a further communication link, for example via a Wi-Fi connection. In case of an unconnected tag, network parameters are typically read from the tag by an installation device via an RFID connection. Subsequently, the installation device incorporates the host device securely into the network via a further communication link, for example via a Wi-Fi connection.

In both cases, however, malicious parties may gain access to the network parameters, which is detrimental to the overall security of the network. Several attack scenarios are possible. For example, an unauthorized person who is visiting a public building, could read out the network key of (part of) the building control system from a host device (e.g. a sensor) and thereby gain access to the network and potentially also to confidential information sent around in this network. Similarly, a malicious visitor could disjoin devices from the legitimate building network and join them into his own network instead, thereby taking control over part—or whole—of the building control network, and imperceptibly adapt the behavior of the existing network and/or extract information about the building and/or its inhabitants.

SUMMARY OF THE INVENTION

It is an object of the invention to improve the security of configuration methods of the kind set forth, in particular of configuration methods which comprise the exchange of configuration data between a configuration device and a host device in order to configure said host device.

This is achieved by the configuration method as defined in claim 1, the corresponding computer program product as defined in claim 14, and the corresponding control system as defined in claim 15.

According to an aspect of the invention a configuration method for configuring a host device in a control system is conceived, in particular a building control system, wherein an authorized configuration device exchanges confidential configuration data with a radio frequency identification tag coupled to the host device, wherein, after the confidential configuration data have been exchanged and a corresponding configuration operation has been performed, access to the confidential configuration data by an unauthorized configuration device is precluded.

According to an exemplary embodiment of the invention, the access to the confidential configuration data is precluded by encrypting the confidential configuration data.

According to a further exemplary embodiment of the invention, the authorized configuration device encrypts the confidential configuration data and overwrites the confidential configuration data in the radio frequency identification tag with the encrypted confidential configuration data.

According to a further exemplary embodiment of the invention, the authorized configuration device sends an encryption key to the radio frequency identification tag and the radio frequency identification tag encrypts the confidential configuration data.

According to a further exemplary embodiment of the invention, the authorized configuration device sends an encryption key to the host controller and the host controller encrypts the confidential configuration data and overwrites the confidential configuration data in the radio frequency identification tag with the encrypted confidential configuration data.

According to a further exemplary embodiment of the invention, the authorized configuration device precludes the access to the confidential configuration data by deleting the confidential configuration data from the radio frequency identification tag and by storing a back-up copy of the confidential configuration data.

According to a further exemplary embodiment of the invention, said authorized configuration device or a further authorized configuration device re-virginizes the host device by restoring the confidential configuration data in the radio frequency identification tag.

According to a further exemplary embodiment of the invention, exchanging the confidential configuration data and performing a corresponding configuration operation is only possible if the host device is not in a configured state.

According to a further exemplary embodiment of the invention, exchanging the confidential configuration data and performing a corresponding configuration operation is only possible if the authorized configuration device has successfully authenticated itself to the host device.

According to a further exemplary embodiment of the invention, the authorized configuration device precludes the access to the confidential configuration data by locking a memory unit of the radio frequency identification tag, wherein said locking comprises setting an authentication key for accessing the memory unit.

According to a further exemplary embodiment of the invention, the access to the confidential configuration data is precluded by disabling the radio frequency identification tag.

According to a further exemplary embodiment of the invention, the radio frequency identification tag is disabled by switching off the radio frequency identification tag.

According to a further exemplary embodiment of the invention, the radio frequency identification tag is disabled by decoupling the radio frequency identification tag from its antenna.

According to a further exemplary embodiment of the invention, the host device is re-virginized by unlocking a backdoor to reset the host device to its "virgin" state.

According to a further exemplary embodiment of the invention, a condition for unlocking the backdoor comprises at least one of the following group: pushing a hidden button on the host device, cutting power to the host device, a network being unreachable by the host device, the host device having been removed from its socket, the host device having received a disjoin message, the host device having been provided with a manufacturer-defined unlock code.

According to a further exemplary embodiment of the invention, configuring the host device comprises enabling the host device to join a network, and the confidential configuration data comprise network parameters required for joining said network.

According to a further aspect of the invention a configuration device is conceived, in particular a portable configuration device, for use as an authorized configuration device in a configuration method of the kind set forth.

According to a further aspect of the invention a computer program product is conceived which comprises program elements executable by the authorized configuration device or the host device, wherein each program element comprises program instructions which, when being executed by the authorized configuration device or the host device, cause said authorized configuration device and host device to carry out or control respective steps of a configuration method of the kind set forth.

According to a further aspect of the invention a control system is conceived, in particular a building control system, comprising a host device and an authorized configuration device, wherein the authorized configuration device is arranged to exchange confidential configuration data with a radio frequency identification tag coupled to the host device, wherein the control system is arranged to preclude access to the confidential configuration data by an unauthorized configuration device after the confidential configuration data have been exchanged and a corresponding configuration operation has been performed.

BRIEF DESCRIPTION OF THE DRAWINGS

The invention will be described in more detail with reference to the appended drawings, in which.

DESCRIPTION OF EMBODIMENTS

Figure 1:
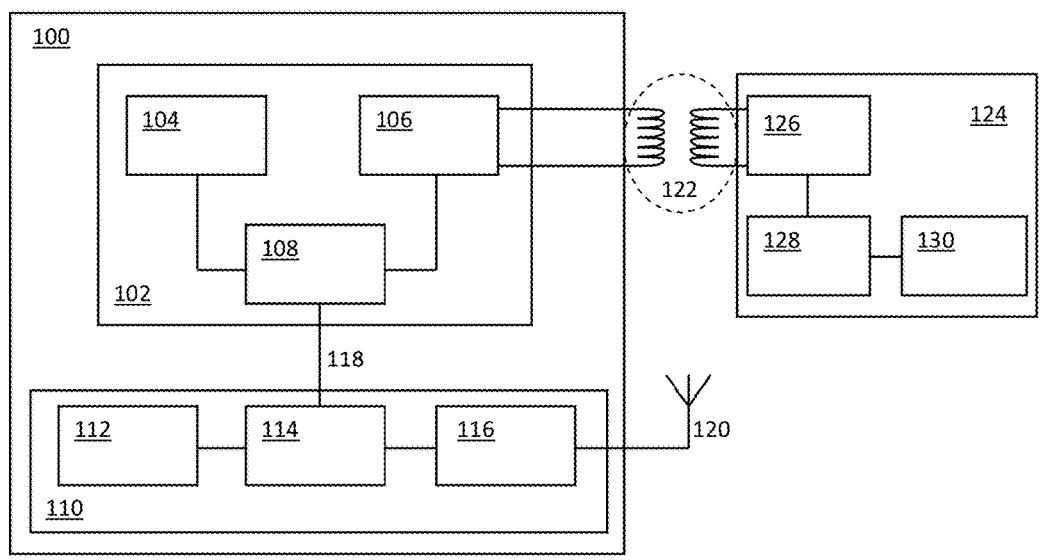
FIG. 1 illustrates a control system wherein a conventional method for configuring a host device is used.

FIG. 1 illustrates a control system wherein a conventional method for configuring a host device is used. RFID technology is an important tool for simplifying the configuration (including the installation) of wireless devices. By simply bringing two devices in close proximity of each other—"touching"—these devices establish a (secure) network connection and/or a control relationship between each other. Network parameters, including encryption keys, can be exchanged over a very short distance which makes eavesdropping difficult, even if no channel encryption is used.

FIG. 1 shows a method which is used for easily joining a host device 100 into a network by means of a so-called connected RFID tag 102. For example, this method enables joining a sensor into a building control network. First, device information may be read out from the connected tag 102 and subsequently device-specific network configuration data may be written into the tag 102, thereby enabling the host device 100 to join the network. As an example, the host device 100 may be an "Enrollee" as defined in the Wi-Fi Alliance's Wi-Fi Simple Configuration standard (Wi-Fi Alliance, "Wi-Fi Simple Configuration, Technical Specification, version 2.0.0," December 2010) and the configuration device 124 may be a "Registrar" as defined in said standard. The configuration device 124 may for example be an NFC-enabled mobile installation device which is capable of establishing an RFID connection with the RFID tag at the standard operating frequency of NFC (13.56 MHz).

The control system depicted in FIG. 1 comprises the following elements. A host device 100 comprises a host processor 110. The host processor comprises a host memory 112, a host controller 114 and a wireless network interface 116 for establishing a wireless network connection 120. A radio frequency identification (RFID) tag 102 is coupled to the host device 100, in particular to the host controller 114, via a host connection 118 which is a wired data connection. Since the RFID tag 102 has such a wired data connection to the host controller 114 it is referred to as a "connected tag". The RFID tag 102 comprises a non-volatile memory 104, a tag controller 108 and an RFID interface 106 for establishing an RFID connection 122 with an authorized configuration device 124. The authorized configuration device comprises an NFC interface device or an active RFID device 126 for establishing said RFID connection 122, a controller 128 and a memory 130.

In operation, a new host device 100 which has not joined a network yet is joined into a network in the following way. The authorized configuration device 124 reads information (for example a device identifier) from the connected tag 102 via the RFID connection 122 and based on this information it creates network join information. Next, it writes the network join information to the connected RFID tag 102. Next, the host controller 114 will read the network join information from the connected RFID tag 102 via the host connection 118. The host device 100 is now able to join the wireless network via the wireless network connection 120, i.e. the host controller 114 may implement a joining operation using said network join information.

Figure 2:
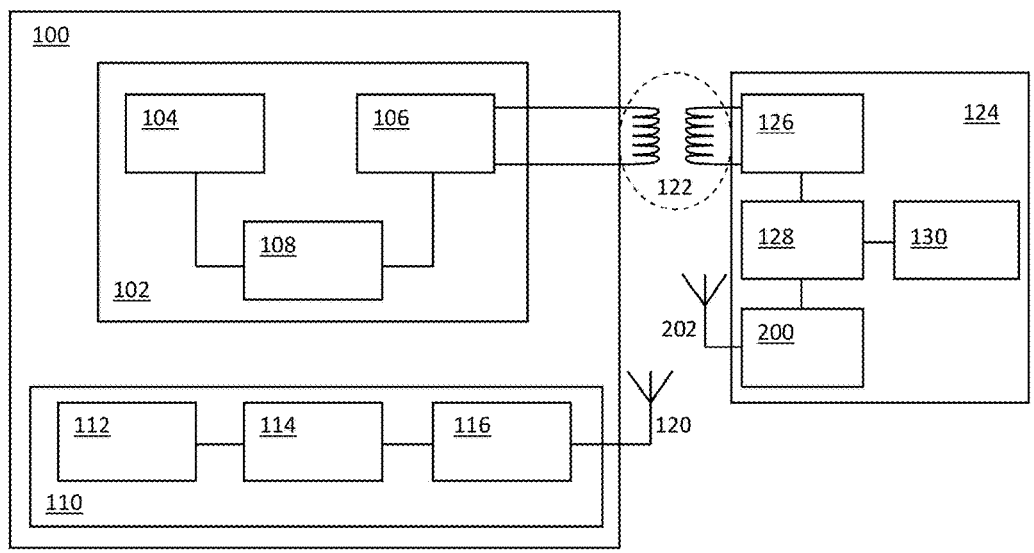
FIG. 2 illustrates a control system wherein an alternative conventional method for configuring a host device is used.

FIG. 2 illustrates a control system wherein an alternative conventional method for configuring a host device is used. In this case the RFID tag 102 is an unconnected tag in the sense that it does not have a wired data connection with the host controller 114.

This alternative conventional method for configuring a host device corresponds to the network joining scenario as described in the Wi-Fi Alliance's Wi-Fi Simple Configuration (WSC) standard. According to this scenario, a host device 100—known as Enrollee—intends to join an existing Wi-Fi network administered by a second device—known as Registrar—which corresponds to the authorized configuration device 124. According to an implementation of said method—known as "Password Token"—a (passive) RFID tag attached to the housing of the Enrollee contains networking credentials of that Enrollee (e.g. MAC-address, public key). The Registrar, which is equipped with an NFC interface device or an active RFID device, can read these credentials and use them in subsequent in-band communications over the Wi-Fi network to eventually join the Enrollee securely into the Wi-Fi network.

Figure 3:
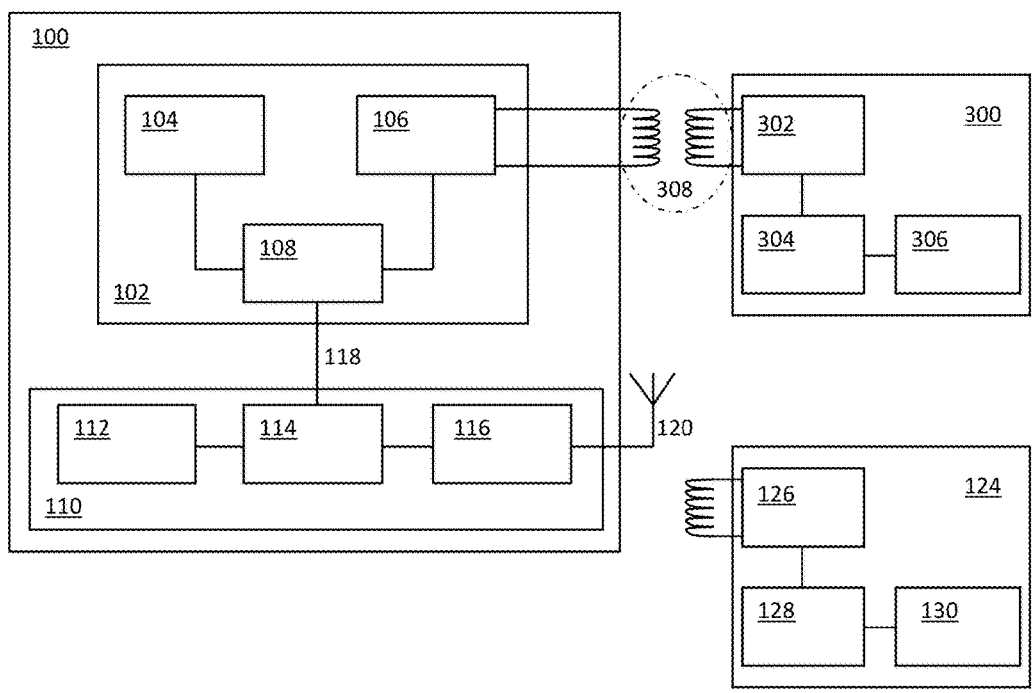
FIG. 3 illustrates a security breach in a control system wherein a conventional method for configuring a host device is used.

FIG. 3 illustrates a security breach in a control system wherein a conventional method for configuring a host device is used. In this example, an unauthorized configuration device 300 is able to read confidential device-specific information from the RFID tag 102 and/or overwrite network join information stored in the RFID tag 102 via an RFID connection 308. The unauthorized configuration device 300 also comprises an NFC interface device or an active RFID device 302, a controller 304 and a memory 306.

The RFID tag 102 may contain confidential device-specific information—other than the network configuration data—that is needed to join the host device 100 into a network and/or pair the host device 100 later on with other devices. An example of such confidential device-specific information is a symmetric key which is later on required by other network devices to authenticate (using message authentication codes) against the host device 100, for example to enable operations like pairing. Such information should only be accessible before joining, such that the authorized configuration device 124 can read this information and store it securely somewhere in the network. After joining, the information should not be accessible anymore in order to prevent unauthorized devices from authenticating against the host device 100.

Note that the host device 100 and the RFID tag 102 coupled to it will typically be easily physically accessible by unauthorized persons after installation, which aggravates the problem. For example, in case of a building control network in a public building the devices will be installed in each and every room and anyone will have access to those rooms.

Furthermore, a malicious person will be able to remove a host device 100 from a legitimate network—network A—and join it into his own network—network B—instead, if no measures are taken to prevent him from writing new network configuration information into the host device's tag 102, after the host device 100 has joined into a network. In this way the malicious visitor could take over part—or whole—of the network, and imperceptibly adapt its behavior and/or extract information from it. For example, if network A is a building control network, the attacker will be able to extract information about the building and/or its inhabitants.

Figure 4:
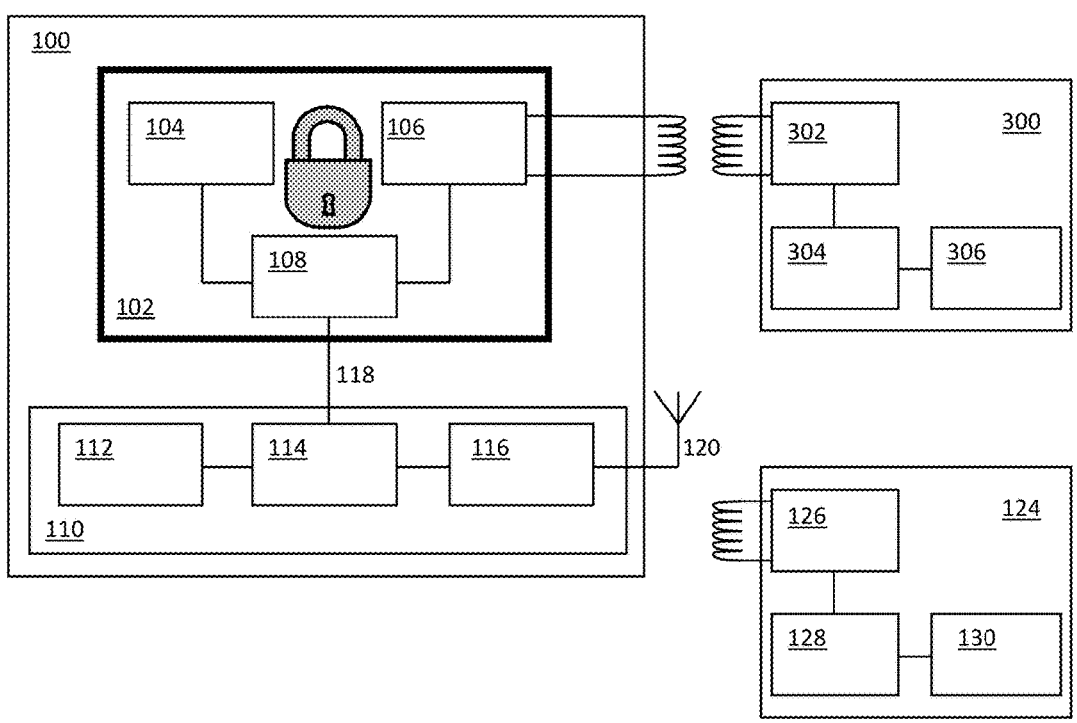
FIG. 4 illustrates a control system wherein a method for configuring a host device according to the invention is used.

FIG. 4 illustrates a control system wherein a method for configuring a host device according to the invention is used. According to the invention, access to confidential configuration data by an unauthorized configuration device 300 is precluded after said confidential configuration data have been exchanged between the authorized configuration device 124 and the RFID tag 102 and a corresponding configuration operation has been performed. Thus, the RFID tag 102 may be regarded as "locked" after the confidential configuration data have been exchanged between the authorized configuration device 124 and the RFID tag 102 and a corresponding configuration operation has been performed. For example, the RFID tag 102 may be locked after network parameters have been exchanged and a network join operation has been performed.

According to an exemplary embodiment of the invention, locking the RFID tag 102 may be implemented by encrypting the confidential configuration data and overwriting the confidential configuration data in the RFID tag 102 by the encrypted version of the same parameters. The key which is used to encrypt the information is typically a key that is only known to authorized configuration devices within the network. The set of authorized configuration devices includes the authorized configuration device 124 and further authorized configuration devices. Since the key is only known to such authorized configuration devices only they can read the parameters from then on. Any read attempt by a device not in possession of the key, i.e. an unauthorized configuration device, will not be responded to by the RFID tag 102 in a meaningful way. Thus, in accordance with the invention RFID tags will have at least two states: (1) virgin, (2) part of a network. A configuration operation such as network joining will cause an RFID tag 102 to move from state (1) to state (2).

Furthermore, according to a further exemplary embodiment of the invention, the authorized configuration device 124 or a further authorized configuration device re-virginizes the host device 100 by restoring the confidential configuration data on the RFID tag 102. Only an explicit action by an authorized configuration device can cause the tag to move from state (2) back to state (1). Such an action could for example be to overwrite the encrypted information with the plain-text information again through the RFID connection. An alternative implementation for host devices with a connected tag would be that the authorized configuration device sends the key in a secure way to the host controller 114, after which the host controller 114 decrypts the confidential configuration data in the RFID tag 102 again.

Exemplary steps of a configuration method which includes preventing reading of confidential configuration data after network joining by encrypting said parameters are:

1. The authorized configuration device 124 reads the confidential configuration data from the RFID tag 102.

2. The authorized configuration device 124 encrypts the confidential configuration data with a key unique to the network (this is a "shared secret" and could simply be the network key). Alternatively, the authorized configuration device 124 sends the key to the host controller 114 via the wireless network connection 120 and the host controller 114 encrypts the confidential configuration data.

3. The authorized configuration device 124 overwrites the confidential configuration data on the RFID tag 102 with the encrypted version of the confidential configuration data. Alternatively, in case the host controller 114 encrypts the confidential configuration data, the host controller 114 performs said overwrite operation via the host connection 118.

According to another example, the RFID tag 102 may have built-in support to encrypt or decrypt (parts of) its non-volatile memory 104. In case the RFID tag 102 supports such a mechanism, the three steps above can be replaced by simply sending an encryption key, for example the network key or information derived from the network key, to the RFID tag 102, which will then be used by the RFID tag 102 to encrypt the part of the non-volatile memory 104 which contains the confidential configuration data.

When the host device 100 later on must be taken out of the network (disjoined) and joined into a new network, an authorized configuration device which possesses the encryption key can "unlock" the RFID tag 102 by decrypting the confidential configuration data in the RFID tag 102 again.

According to a further exemplary embodiment of the invention, access to the confidential configuration data on the RFID tag 102 can be precluded by deleting them after they have been exchanged between the authorized configuration device 124 and the RFID tag 102 and a corresponding configuration operation has been performed. For example, in case the configuration data are network parameters for joining a network, the network parameters are deleted from the RFID tag 102 after the host device 100 has joined said network.

In order to allow the host device 100 to be joined later into a different network, a backup copy should be stored safely by the authorized configuration device 124. This can be implemented in the same way for connected and non-connected tags.

Exemplary steps of a configuration method which includes preventing reading of confidential configuration data after network joining by deleting said parameters are:

1. The authorized configuration device 124 reads the data from the RFID tag 102.

2. The authorized configuration device 124 safely stores the confidential configuration data in its own non-volatile memory 130 or in a memory somewhere else in the network.

3. The authorized configuration device 124 deletes the confidential configuration data from the RFID tag 102.

When the host device 100 later must be taken out of the network (disjoined) and joined into a new network, the authorized configuration device 124 can copy the confidential configuration data into the RFID tag 102 again.

Further measures are desirable to prevent a malicious user from joining a host device 100 into his own network and taking over control of the host device 100 by overwriting the confidential configuration data in the RFID tag 102. For example, assume a network join scenario in which the malicious user does not need to read device-specific information from the host device's RFID tag 102 in order to join the host device 100 in a network. In such a scenario a malicious user could employ an unauthorized configuration device 300 to overwrite the confidential configuration data in the RFID tag 102 and thereby join the host device 100 into his network.

According to yet a further exemplary embodiment of the invention, such a malicious action can be prevented by allowing the host device's microcontroller, i.e. the host controller 114, to participate in network joining only if it is not part of a network yet (i.e. if the host device 100 is in a "virgin" state).

According to an alternative exemplary embodiment of the invention, such a malicious action can be prevented by using a pair of tokens, with the first of the two tokens being stored in the RFID tag 102 and the second token being securely stored in the host device's microcontroller, i.e. the host controller 114, or in a host memory 112 to which the host controller 114 has access. The configuration device 124 has to present some form of proof to the host device 100 that it has knowledge of the value of the first token, before the host device will accept the new configuration data. Here, we assume that the host device 100 will now and then (e.g. periodically or after a reset/power down) read the configuration data from the connected RFID tag 102. This approach enables that the host device 100 can still be joined into a different network via RFID communication.

Exemplary steps of a configuration method which includes presenting a token to the host device 100 before it will accept new configuration data are:

1. The authorized configuration device 124 reads the first token from the RFID tag 102.

2. The authorized configuration device 124 writes the new configuration data to the RFID tag 102, preferably in encrypted form, along with some proof that it has knowledge of the value of the first token.

3. The authorized configuration device 124 overwrites the first token in the RFID tag 102.

The second step is important, because only if the host device 100 proves that it has knowledge of the first token, the host device 100 will accept the new configuration data. Various implementations of verifying the proof and the kind of the tokens will be described below. Since the first token is overwritten in the third step, a malicious person cannot perform the second step subsequently. Therefore, any configuration data written into the RFID tag 102 by this person will not be accepted by the host device 100.

In order to allow the host device 100 to be joined into a different network at a later point in time, the authorized configuration device 124 may save a copy of the token. For example, the authorized configuration device 124 may store the token in encrypted form in the RFID tag 102, preferably at the same location as the original token, thereby automatically overwriting the original one with meaningless data (in the sense that an authorized configuration device 300 cannot interpret these data). Alternatively, the authorized configuration device 124 may save the original token in its own non-volatile memory 130 or in a memory somewhere else in the network. With this copy the authorized configuration device 124 can always restore the original token in the RFID tag 102, thereby allowing the host device 100 to be joined into a different network at a later point in time.

The pair of tokens can for example be implemented as follows:

The first token may be a random (unpredictable) number and the second token may be a copy of the first token. In this case, the host device 100 can simply compare the values of the first token written in step 2 with its own token (the second token).

The first token may be a symmetric key and the second token may be a copy of the first token. In this case, there are at least three possible implementations for step 2:

A Message Authentication Code (MAC) with as inputs the configuration data and the symmetric key can be written into the RFID tag 102 in step 2, along with the configuration data; the host device 100 can validate this MAC by calculating a second MAC with as inputs the configuration data and its own copy of the symmetric key and compare the two MACs afterwards.

Alternatively, the authorized configuration device 124 encrypts the configuration data with the symmetric key which it has read in step 1, before writing the configuration data into the RFID tag 102 in step 2; the host device 100 can decrypt the configuration data with its own copy of the symmetric key and check whether the decrypted data contains valid configuration data (instead of meaningless data).

As a third alternative, these two implementations can be combined, i.e. the symmetric key may be used to encrypt the data as well as to add a MAC to it.

The first and second token may form a public-key pair. In this case, there are again at least three implementations possible for step 2:

A signature with as inputs the configuration data and the first (or private) key can be written into the RFID tag 102 in step 2, along with the configuration data; the host device 100 can validate this signature by decrypting the signature using the second (or public) key and comparing the resulting cryptographic hash code with a cryptographic hash code that it calculates itself over the received configuration data.

Alternatively, the authorized configuration device 124 encrypts the configuration data with the key which it has read in step 1, before writing the configuration data into the RFID tag 102 in step 2; the host device 100 can decrypt the configuration data with its own key and check whether the decrypted data contains valid configuration data (instead of meaningless data).

As a third alternative, these two implementations can be combined, i.e. the first (or private) key may be used to encrypt the data as well as to add a signature to it.

The advantage of using a symmetric key or a public-key pair is that the configuration data can be obfuscated (by enciphering) and that unauthorized modifications (e.g. via a man-in-the-middle attack) can be detected using the MAC or the signature respectively.

If the host device's microcontroller (i.e. the host controller 114) is allowed to participate in network joining only if it is not part of a network yet (i.e. if the host device 100 is in a "virgin" state) then the host device 100 needs to have a copy of the active configuration data stored elsewhere. Otherwise, the malicious user could still disjoin the host device 100 from its current network by overwriting the configuration data in the RFID tag 102 with meaningless data, thereby rendering the host device 100 useless (i.e. disrupt its service).

When the host device 100 must be taken out of the network (disjoined) at a later point in time and joined into a new network, an authorized configuration device which has knowledge of the encryption key can "unlock" the RFID tag 102 by decrypting the token in the RFID tag 102 again.

There are some types of RFID tags, such as the MIFARE Ultralight C or ICODE SLI-C tags, which support authentication to lock (parts of) the memory. According to a further exemplary embodiment of the invention which is applicable to these types of RFID tags, access to the confidential configuration data is precluded by locking a memory unit 104 of the RFID tag 102 in question. In particular, said locking of the memory unit 104 comprises setting an authentication key for accessing said memory unit 104 on the RFID tag 102. The authentication key may be a network key or information derived from the network key, for example. If such an authentication key is set, only devices belonging to the network will be able to read or overwrite (parts of) the data in the RFID tag 102. Again, only a member of the network which knows the encryption key can remove the usage restrictions of the RFID tag 102 by resetting the authentication key to its default (known) value, for example an all-zeroes value.

According to yet a further exemplary embodiment of the invention, access to the confidential configuration data on the RFID tag 102 can be precluded by disabling the RFID tag 102 completely after said parameters have been exchanged between the authorized configuration device 124 and the RFID tag 102 and a corresponding configuration operation has been performed, for example, after the host device 100 has joined the network.

In this scenario, the authorized configuration device 124 disables the host device's RFID tag 102 completely by writing to the tag itself or by sending a control message to the host device 100. For a connected RFID tag both options are possible. The control system could instruct the RFID tag 102 to switch off. Alternatively, the authorized configuration device 124 could disable the connected tag directly, and re-enabling the tag at a later point in time could only be done through the host device's control system, for example. It is noted that the control system is always needed to re-enable the tag, because by definition a disabled tag cannot be used anymore via its RFID interface.

For a non-connected tag one could conceive to decouple the RFID tag from its antenna, for example by adding a transistor under control of a PIO-pin of the microcontroller, i.e. the host controller 114. It is noted that this makes the tag to a certain extent a connected tag, because a single "antenna-enable" wire is required between the host controller 114 and the RFID tag 102.

It is noted that the use of this exemplary embodiment is limited to initial network joining, which may include the initial pairing of host devices. It is not possible to perform another operation—such as pairing—at a later point in time via the RFID tag 102. For example, pairing scenarios in which a lamp is touched to a switch, after which the switch reads out the lamp's identifier from the RFID tag 102, is no longer possible. However, for some applications this approach may suffice. Only the authorized configuration device 124 or another installation device enabled for the same network can re-enable reading of the RFID tag 102, i.e. bring the host device 100 into the "virgin" state again, by sending a control message to the host device 100.

If the configuration method according to the invention is applied, the RFID tag 102 and/or the state of the host controller 114 is modified in some way to avoid that they are used by anyone who is not in possession of a network's secrets (i.e. the encryption key, backup copies of device tokens etc.). If for some reason the network has ceased to exist, then its secrets are lost. If the host devices within the network have not been properly re-virginized before the network ceased to exist, then the host devices are rendered useless. Therefore, further measures may be implemented to re-virginize host devices if a network has ceased to exist. These measures are based on the idea to build in a so-called backdoor in the configuration method and the corresponding control system according to the invention.

How easy it is to access such a backdoor depends on the application and the associated threats (attack vectors). The following conditions can be chosen from to define an unlock condition for a backdoor to reset a host device to its "virgin" state:

Pushing a hidden button: a hidden button on the device to reset the device to its "virgin" state. Clearly, this button should not be as easily accessible to the general public as the RFID tag is.

Cut power to the host device: the power needs to be switched off and on again. In practice, this could be done by e.g. unscrewing a lamp or removing the batteries of a sensor node. Clearly, cutting the power on its own is not sufficient in many cases; for example, it would result in problems in situations where power is cut as part of normal operation (e.g. at night). Furthermore, it may cause significant problems in case of power failures.

The network is unreachable: the network to which the device belongs must be unreachable.

Remove the host device from its socket: for example, in WO/2010/116327 a method is described to determine whether a retrofit lamp is removed from a standard socket (e.g. E14, E27) even when the socket cannot be relied on to be permanently powered.

Send a disjoin message: send a disjoin message to the host device, either via the existing network or via a network with default or predefined configuration data.

Provide a manufacturer-defined unlock code: an unlock code is provided to the tag via the network and/or the tag itself. For example, a request containing a unique identification (e.g. serial number) of the device is sent to (a web-service supplied by) the device's manufacturer. As part of the same request also the credentials of the requester are supplied (e.g. a credit card payment may function as such) to enable traceability. The manufacturer (web-service) responds with the unlock code (similar to a PUK code which is needed to unlock a SIM card when it has been disabled). Alternatively, this service can also be provided by another trusted party ("online backup provider") assuming that this party has access to these data.

The skilled person will appreciate that the above-mentioned list is not exhaustive and that other conditions may also be conceived. Furthermore, any subset of the above-mentioned conditions may be selected in order to define a composite condition that needs to be satisfied in order to unlock the backdoor and reset the host device to its "virgin" state. Furthermore, a specific sequence can be selected in which these conditions need to be satisfied, as well as the duration of these conditions or events, or the time window in which these conditions must be satisfied.

For example, the following composite backdoor condition may be defined:

First, the power should be cut off.
Then, the network should be unreachable for more than half an hour.
Finally, a button needs to be pressed.
All of this has to happen between 2 o'clock and 3 o'clock in the morning.

It is assumed that either no configuration data in the tag 102 have been overwritten or deleted, or that the host controller 114 has stored a copy of the configuration data somewhere else. After having been re-virginized, the host controller 114 should restore the original contents of the tag 102, i.e. the configuration data. In case that the tag 102 is a connected tag, the host controller 114 can restore the original contents of the tag autonomously via the wired host connection 118. In case that the tag is a non-connected tag, the host controller 114 should expose the configuration data, for example over its wireless network interface 116, to a configuration device that can subsequently reprogram the tag 102 by writing the configuration data back to it.

It is noted that the security features according to the invention may find their way into a variety of customer end products including, but not limited to, wireless sensor nodes, lighting fixtures and smart appliances. In the context of building control systems the security features according to the invention are particularly useful. However, also in other control system the security features according to the invention may be used to advantage.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 host device
102 RFID tag
104 non-volatile memory
106 RFID interface
108 tag controller
110 host processor
112 host memory
114 host controller
116 wireless network interface
118 host connection
120 wireless network connection
122 RFID connection
124 authorized configuration device
126 NFC interface device or active RFID device
128 controller
130 memory
200 wireless network interface
202 wireless network connection
300 unauthorized configuration device
302 NFC interface device or active RFID device
304 controller
306 memory
308 RFID connection

The invention claimed is:

1. A configuration method for configuring a host device in a control system comprising:
exchanging, with an authorized configuration device, which is authorized to exchange confidential configuration data with a radio frequency identification tag coupled to the host device, said confidential configuration data with said radio frequency identification tag coupled to the host device;

precluding after the confidential configuration data have been exchanged and a corresponding configuration operation has been performed, access to the confidential configuration data by an unauthorized configuration device, which is not authorized to exchange said confidential configuration data with said radio frequency identification tag, by locking said radio frequency identification tag, wherein said locking occurs by encrypting the confidential configuration data;

enabling, with the confidential configuration data, the host device to join a network, wherein the confidential configuration data comprises network parameters required for joining the network; and locking, with the authorized configuration device, the radio frequency identification tag by deleting the confidential configuration data from the radio frequency identification tag and by storing a back-up copy of the confidential configuration data in a non-volatile memory of the authorized configuration device.

2. The configuration method as claimed in claim 1, further comprising:
encrypting, with the authorized configuration device, the confidential configuration data; and
overwriting the confidential configuration data in the radio frequency identification tag with the encrypted confidential configuration data.

3. The configuration method as claimed in claim 1, further comprising:
sending, with the authorized configuration device, an encryption key to the radio frequency identification tag; and
encrypting, with the radio frequency identification tag, the confidential configuration data.

4. The configuration method as claimed in claim 1, further comprising:
sending, with the authorized configuration device, an encryption key to the host controller;
encrypting, with the host controller, the confidential configuration data; and
overwriting the confidential configuration data in the radio frequency identification tag with the encrypted confidential configuration data.

5. The configuration method as claimed in claim 1, further comprising:
restoring, with the authorized configuration device, the confidential configuration data in the radio frequency identification tag.

6. The configuration method as claimed in claim 1, wherein exchanging the confidential configuration data and performing the corresponding configuration operation is only possible when the host device is not in a configured state.

7. The configuration method as claimed in claim 1, wherein exchanging the confidential configuration data and performing the corresponding configuration operation is only possible when the authorized configuration device has successfully authenticated itself to the host device.

8. The configuration method as claimed in claim 1, wherein the authorized configuration device locks said radio frequency identification tag by locking a memory unit of the radio frequency identification tag, and wherein said locking of the memory unit comprises:
setting an authentication key for accessing the memory unit.

9. The configuration method as claimed in claim 1, further comprising:
locking said radio frequency identification tag by disabling the radio frequency identification tag.

10. The configuration method as claimed in claim 9, further comprising:
disabling the radio frequency identification tag by switching off the radio frequency identification tag.

11. The configuration method as claimed in claim 9, further comprising:
disabling the radio frequency identification tag by decoupling the radio frequency identification tag from its antenna.

12. The configuration method as claimed in claim 1, further comprising:
unlocking a backdoor to reset the host device to its "virgin" state.

13. The configuration method as claimed in claim 12, wherein a condition for unlocking the backdoor comprises at least one of the following group: pushing a hidden button on the host device, cutting power to the host device, a network being unreachable by the host device, the host device having been removed from its socket, the host device having received a disjoin message, and the host device having been provided with a manufacturer-defined unlock code.

14. A non-transitory computer readable medium encoded with a computer program product comprising program elements executable by the authorized configuration device or the host device, wherein each program element comprises program instructions which, when being executed by the authorized configuration device or the host device, cause said authorized configuration device and the host device to carry out or control respective steps of the configuration method as claimed in claim 1.

15. A control system comprising:
a host device and
an authorized configuration device which is configured to exchange confidential configuration data with a radio frequency identification tag coupled to the host device, wherein the control system is configured to preclude access to the confidential configuration data by an unauthorized configuration device, which is not authorized to exchange said confidential configuration data with said radio frequency identification tag, by locking said radio frequency identification tag after the confidential configuration data have been exchanged and a corresponding configuration operation has been performed, wherein configuring the host device comprises enabling the host device to join a network, and the confidential configuration data comprises network parameters required for joining the network, wherein the authorized configuration device is configured to lock the radio frequency identification tag by deleting the confidential configuration data from the radio frequency identification tag and storing a back-up copy of the confidential configuration data in a non-volatile memory of the authorized configuration device.

* * * * *